United States Patent [19]

Dougherty et al.

[11] Patent Number: 4,977,220

[45] Date of Patent: Dec. 11, 1990

[54] EPOXY END-CAPPED DIOLEFIN DERIVATIVES, POLYMERS THEREOF, AND PROCESSES FOR FORMING SAME

[75] Inventors: Thomas K. Dougherty, Playa del Rey; Susan L. Oldham, Torrance; William E. Elias, Redondo Beach, all of Calif.

[73] Assignee: Hughes Aircraft Company, Los Angeles, Calif.

[21] Appl. No.: 485,925

[22] Filed: Feb. 20, 1990

Related U.S. Application Data

[60] Division of Ser. No. 274,676, Nov. 21, 1988, abandoned, which is a continuation-in-part of Ser. No. 118,592, Nov. 9, 1987, abandoned.

[51] Int. Cl.[5] .................... C08G 59/02; C08G 59/22; C08C 19/06; C08C 19/40
[52] U.S. Cl. .................... 525/332.3; 549/512; 525/359.2; 528/393
[58] Field of Search .................... 525/332.3; 549/512

[56] References Cited

U.S. PATENT DOCUMENTS

| | | | |
|---|---|---|---|
| 3,010,976 | 11/1961 | Greenspan et al. | 549/512 |
| 3,078,254 | 2/1963 | Zelinski et al. | 525/332.3 |
| 3,458,491 | 7/1969 | Dennis | 525/332.3 |
| 4,276,394 | 1/1981 | Kennedy et al. | 525/319 |
| 4,450,259 | 5/1984 | Roggero et al. | 526/173 |
| 4,486,373 | 12/1984 | Kurauchi et al. | 264/142 |
| 4,518,753 | 5/1985 | Richards et al. | 526/177 |

FOREIGN PATENT DOCUMENTS 49-897W/30 of 1974 Japan .................... 525/332.3
49-108196 10/1974 Japan .

OTHER PUBLICATIONS

*Makromol. Chem.*, vol. 179, pp. 551–555, Beinert et al.
*Polymer Preprints*, vol. 26, No. 1, Apr. 1985, pp. 241–243, Broske et al.
*J. Polymer Science*, vol. 20, pp. 2809–2817, Kennedy et al.

*Primary Examiner*—Earl A. Nielsen
*Assistant Examiner*—Frederick Krass
*Attorney, Agent, or Firm*—Mary E. Lachman; W. K. Denson-Low

[57] ABSTRACT

Epoxy end-capped oligomers of 1,3-diolefin compounds of Formula I

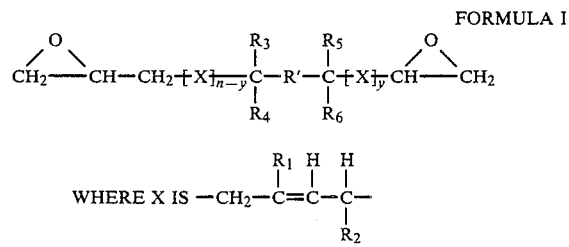

WHERE X IS $-CH_2-\underset{R_2}{\overset{R_1}{C}}=\overset{H}{C}-\overset{H}{\underset{}{C}}-$ $R'$ = ALIPHATIC, CYCLOALIPHATIC, OR AROMATIC GROUP HAVING 2 TO 20 C $R_1, R_2, R_3, R_4, R_5,$ OR $R_6$ IS H OR ALKYL $n = 1$ TO $10$ $y = 0$ TO $(n - 1)$ These oligomers are formed by:

(a) reacting a 1,3-diolefin compound having 4 to 12 carbon atoms per molecule with a difunctional initiator comprising anionic reactive sites to form an intermediate living oligomer comprising two anionic end groups; and (b) reacting the intermediate living oligomer with a halohydrin compound to epoxidize the two anionic end groups and form the desired oligomer.

The oligomers are subsequently reacted with an epoxidizing agent to form a polymer having epoxy-derived linkages at regular intervals along the chain of the polymer.

8 Claims, No Drawings

EPOXY END-CAPPED DIOLEFIN DERIVATIVES, POLYMERS THEREOF, AND PROCESSES FOR FORMING SAME

This is a division of application Ser. No. 07/274,676, filed Nov. 21, 1988, now abandoned, which is a continuation-in-part of application Ser. No. 07/118,592, filed Nov. 9, 1987, now abandoned.

BACKGROUND OF THE INVENTION

1. Field of the Invention

The present invention relates generally to epoxy end-capped oligomers derived from diolefin compounds, and a process for forming these oligomers, as well as to polymers formed from these oligomers and a process for forming such polymers. A particular feature of the present invention relates to an anionic telechelic process for forming the previously mentioned oligomers.

2. Description of the Background Art

Epoxy resins are widely used as adhesives, encapsulants, and coatings for a variety of applications. In particular, for application to structural and electronic devices, epoxy resins are useful since they provide mechanical protection, good substrate adhesion, thermal and oxidative stability, and moisture and solvent resistance. In addition, compliance is a highly desirable property for these resins since it allows the dissipation of stress that accompanies thermal and mechanical cycling of the encapsulant. Furthermore, enhanced toughness provides mechanical protection against fracture damage. However, state of-the-art systems exhibiting such compliance generally possess poor thermal stabilities. Another important property is the repairability of the adhesive, coating, or encapsulant. As expected, a rigid system is generally more difficult to repair and replace than a ductile one. Finally, as a practical matter, epoxy resins should have low viscosity and good handleability.

One particular type of epoxy compound which has been of interest in the past has been a epoxidized polybutadiene since polybutadiene has desirable flexibility properties. In the preparation of such epoxidized polybutadiene, as indicated, for example, by Lee and Neville, in the book entitled "Handbook of Epoxy Resins," Mc Graw-Hill Book Company, New York, 1967, at pages 3-14 to 3-15, and particularly the formula at page 3-15, butadiene is polymerized and the polybutadiene is subsequently epoxidized. However, in such a process, the epoxidizing agent randomly attacks the vinyl groups along the polybutadiene chain. Another type of epoxy compound of recent interest is an epoxidized polyisobutylene. One method for preparing an epoxidized polyisobutylene comprises the cationic polymerization of gaseous isobutylene and the reaction of the resultant polyisobutylene with meta-chloroperoxy benzoic acid to epoxidize the terminal groups, as described, for example, by J. Kennedy et al in the publication entitled "New Telechelic Polymers and Sequential Copolymers by Polyfunctional Initiator Transfer Agents (Inifers). XVIII. Epoxy and Aldehyde Telechelic Polyisobutylenes," in the *Journal of Polymer Science: Polymer Chemistry Edition*, Vol. 20, 1982 pages 2809–2817. However, in such a process, only the terminal groups on the polyisobutylene are epoxidized. As disclosed by Kennedy et al, telechelic polymers that bear reactive end groups have been used in the preparation of block and/or graft copolymers. The term "telechelic polymers" is used in the art to refer to polymers having two ionic ends by which the polymer growth can be continued, thus giving rise to the alternate name "living polymer". Such "living" polymers are generally described in U.S. Pat. No. 3,458,491 to K. S. Dennis. In addition, the latter patent also describes an anionic polymerization and termination process in which: (1) a diolefin monomer is reacted with a catalyst to form a polymer having negatively charged end groups; and then (2) the polymer is reacted with an external terminating agent to form a polymer having at least 80 percent of the end groups thereof derived from the external terminating agent. In such a process, the "living" polymer is not difunctional and, thus, is not a telechelic polymer. Moreover, the terminating agent adds only to the end groups on the polymer. The basic polymer is formed by free-radical polymerization which cannot be controlled, thus leading to uncontrollable results.

Thus, a need exists for an epoxy resin for electronic and structural applications which is tough, thermally and oxidatively stable, repairable, resistant to moisture and solvents, has good processing characteristics, and can be controlled in its structure.

SUMMARY OF THE INVENTION

The general purpose of the present invention is to provide: (1) a new and improved epoxy resin which is tough, flexible, stable, has good processing characteristics, and can be tailored in its structure to exhibit desired properties; and (2) a method for forming such a resin. This resin and method possess most, if not all, of the advantages of the above prior art resins and methods while overcoming their above mentioned significant disadvantages.

The above-described general purpose of the present invention is accomplished by providing a new group of oligomers derived from a chosen conjugated diolefin compound and having terminal epoxy groups, and forming cured polymers derived from these oligomers. The oligomers of the present invention have Formula I below.

FORMULA I
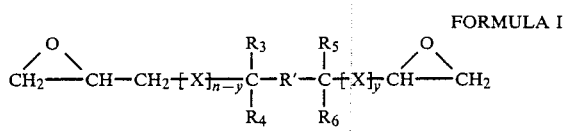

WHERE X IS 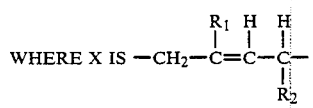

R' = ALIPHATIC, CYCLOALIPHATIC, OR AROMATIC GROUP HAVING 2 TO 20 C $R_1, R_2, R_3, R_4, R_5,$ OR $R_6$ IS H OR ALKYL n = 1 TO 10 y = O TO (n − 1)

These oligomers are formed by: (a) reacting a 1,3-diolefin compound having 4 to 12 carbon atoms per molecule with a difunctional initiator having anionic reactive sites to form an intermediate living oligomer two anionic end groups; and (b) reacting the intermediate living oligomer with a halohydrin compound to epoxidize the two anionic end groups and form the oligomer having Formula I above. The polymers of the present invention are formed by the reaction of the oligomers of the present invention with a epoxy curing agent.

Accordingly, it is a purpose of the present invention to provide epoxy resins which are useful as repairable encapsulants.

Another purpose of this invention is to provide epoxy resins which are useful as tough adhesive, flexibilizer, and coating systems.

Still another purpose of the present invention is to provide epoxy resins of the type described which have low viscosity and good processability.

Another purpose of the present invention is to provide cured polymers having the flexibility of diolefin polymers and the curing advantages of epoxy resins.

Yet another purpose of this invention is to provide cured polymers having epoxy derived linkages at regular and predetermined locations along the polymer chain and having a narrow molecular weight distribution.

Another purpose is to provide a method for forming the above-described polymer in a controlled and reproducible manner.

A further purpose of the present invention is to provide an oligomer from which the above-noted polymer may be formed.

Still another purpose is to provide a method for forming the above-described oligomer.

The foregoing and other objects, features, and advantages of the present invention will be apparent from the following more particular description of the preferred embodiments of the invention.

DETAILED DESCRIPTION OF THE INVENTION

The oligomer compounds in accordance with the present invention comprise epoxy end-capped compounds derived from a chosen 1,3-diolefin compound and have Formula I below.

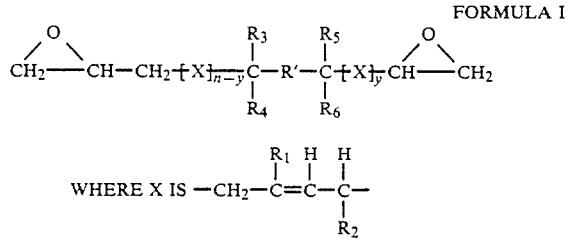

R' = ALIPHATIC, CYCLOALIPHATIC, OR AROMATIC GROUP HAVING 2 TO 20 C $R_1$, $R_2$, $R_3$, $R_4$, $R_5$, OR $R_6$ IS H OR ALKYL n = 1 TO 10 y = 0 TO (n − 1)

The oligomer compounds of the present invention are formed by a process comprising the steps of: (a) reacting a 1,3-diolefin compound having 4 to 12 carbon atoms per molecule with a chosen difunctional initiator comprising anionic reactive sites to form an intermediate living oligomer comprising two anionic end groups; and (b) reacting the intermediate living oligomer with a chosen halohydrin compound to epoxidize the two anionic end groups and form the desired oligomer of Formula I above.

The conjugated diolefin compound comprises an aliphatic compound having 4 to 12 carbon atoms per molecule and a double bond between carbon atoms 1 and 2 and between carbon atoms 3 and 4. This compound is referred to herein as a "1,3-diolefin compound," but it is to be understood that such a compound is the same as a "2,4-diolefin compound," the difference being only the order in which the carbon atoms are numbered. This compound may optionally be substituted with an alkyl group containing 1 to 4 carbon atoms (C1-C4) or an aryl group which is not susceptible to nucleophilic attack and which has no acid hydrogens. The diolefin compound is represented herein by the formula

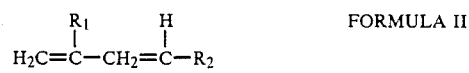

FORMULA II where each of $R_1$ and $R_2$ is hydrogen or a substituted or unsubstituted alkyl group. Preferred diolefin compounds for use in practicing the present invention include 1,3-butadiene; 2-methyl-1,3-butadiene; 1,3-pentadiene; 1,3-hexadiene; 1,3-heptadiene; 2,4-hexadiene; and 2,4-heptadiene.

The difunctional initiator used in the present process comprises a difunctional anionic initiator having two anionic ends, of the type used to form "living" polymers, as generally described in U.S. Pat. No. 3,458,491 to Dennis. In the formation of "living" polymers, the polymer is maintained with negatively charged end groups that are capable of continuing the growth of the polymer. In accordance with the present invention, the initiator is used to provide a "living" oligomer, rather than a polymer, as discussed in greater detail below. The difunctional anionic initiator used in the present process comprises an alkali metal organic compound, comprising an aliphatic, cycloaliphatic, or aromatic group containing 2 to 20 carbon atoms. A preferred initiator for use in the present process comprises the reaction product of secondary butyllithium and meta-diisopropenylbenzene, as generally described in the publication by Beinert et al, entitled "A Bifunctional Anionic Initiator Soluble in Non-polar Solvents", in *Makromol. Chem.*, Vol. 179, 1978, pages 551 to 555. This initiator is prepared by the reaction shown in Equation (1) below, which comprises adding m-diisopropenylbenzene to sec-butyllithium in an inert solvent, such as dry cyclohexane, in the presence of an anionic stabilizer, such as triethylamine or other tertiary amines. It has been found that insoluble products are formed if the tertiary amines are not used in this reaction. Similar initiators may be prepared by reacting sec-butyllithium with other diisopropenyl substituted aromatic hydrocarbon compounds.

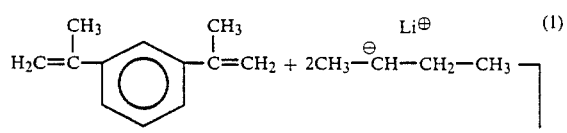

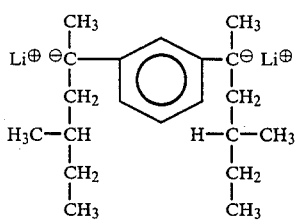

The initiator is represented herein by the general formula

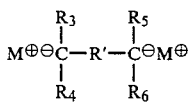

FORMULA III where
M = alkali metal
R' = aliphatic, cycloaliphatic, or aromatic group having 2 to 20 C
$R_3$, $R_4$, $R_5$, or $R_6$ is H or alkyl In accordance with the present invention, the difunctional anionic initiator is reacted with the selected 1,3-diolefin compound in an inert solvent, such as cyclohexane or other cycloaliphatic compounds which do not contain methyl groups, as generally indicated in Equation (2) below. The product of this reaction is a "living" oligomer, in which both ends of the oligomer are negatively charged and capable of further growth.

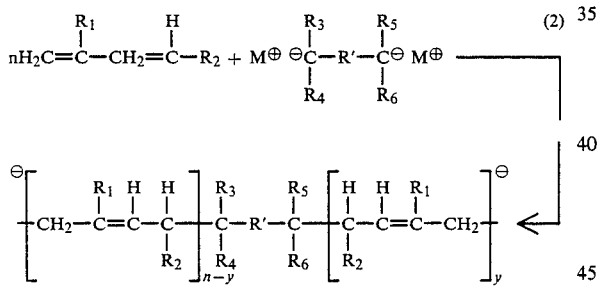

n = 1 TO 10
y = 0 to (n − 1)

The product of Equation (2) above is alternatively represented as

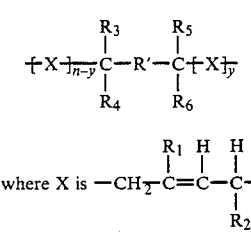

FORMULA IV where X is $-CH_2-C=C-C-$
                    $|\ \ \ |\ \ \ |$
                    $R_1\ H\ H$
                    $\ \ \ \ \ \ \ \ \ \ |$
                    $\ \ \ \ \ \ \ \ \ \ R_2$ $R_1$, $R_2$, $R_3$, $R_4$, $R_5$, or $R_6$ = H or alkyl
R' = aliphatic, cycloaliphatic, or aromatic group having 2 to 20 C
n = 1–10.
y = 0 to (n-1)

It is understood that the term "alkyl" specified above includes both straight chain and branched alkyl groups.

As is known in the art, in the type of reaction shown in Equation (2) above, in the majority of cases, there is an even distribution of diene entity on either side of the entity derived from the initiator. That is, if one starts with "n" molecules of diene, ½n molecules of diene are attached on either side of the initiator-derived entity. However, by the laws of thermodynamics, there is a statistical probability that more diene molecules could be added to one side of the initiator-derived entity than to the other.

The molar ratio of the initiator to the diolefin is within the range of about 1:4 to 1:15, preferably from about 1:4 to 1:12. A ratio equal to one half the value of "n" has been found to be particularly useful. The ratio of the initiator to the diolefin determines the epoxy equivalent (EEQ) of the final resin, as described in further detail in Example 2 herein. The higher the ratio of initiator to diolefin, the higher the EEQ of the final resin. The ratio of 1:4 to 1:15 provides final resins with EEQ's of about 400 to 1200, which provide encapsulants with desirable viscosity, glass transition temperature, and elongation. Ratios in excess of 1:15 produce final resins with EEQs that are too high and do not exhibit epoxy-like properties when cured. Ratios less than 1:4 produce final resins with EEQs that are too low and produce brittle products when cured. In addition, at this low ratio, cure problems can result since complete epoxy termination may not occur.

The living oligomer formed by the reaction shown in Equation (2) is reacted with an epoxidizing agent, such as a halohydrin, preferably epichlorohydrin, in an inert solvent, such as hexane, to epoxidize the end groups on the living oligomer and form the epoxy end-capped oligomer of Formula I below.

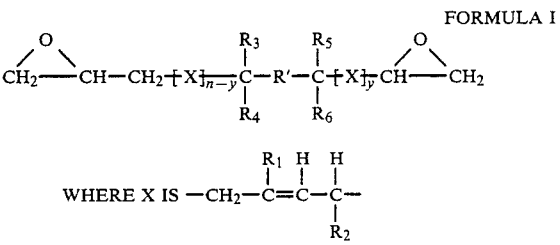

FORMULA I

WHERE X IS $-CH_2-C=C-C-$
                       $|\ \ \ |\ \ \ |$
                       $R_1\ H\ H$
                       $\ \ \ \ \ \ \ \ \ \ |$
                       $\ \ \ \ \ \ \ \ \ \ R_2$

R' = ALIPHATIC, CYCLOALIPHATIC, OR AROMATIC
GROUP HAVING 2 TO 20 C $R_1$, $R_2$, $R_3$, $R_4$, $R_5$, OR $R_6$ IS H OR ALKYL n = 1 TO 10 y = 0 TO (n − 1)

In Formula I above, the value of n is chosen to optimize the epoxy characteristics of the oligomer, and is within the range of 1 to 10, most preferably within the range of 3–5. The value of n is predetermined in the reaction of Equation (2) discussed above.

In accordance with the present invention, the epoxy end-capped oligomer of Formula I above is cured with a known epoxy hardener or curing agent to produce a polymer or cured resin having epoxide-derived linkages at regular intervals along the backbone of the polymer. (The term "resin" is used herein to mean a mixture of polymerizable materials, either before or after polymerization. The term "curing agent" is used herein to mean a hardener and optionally an accelerator.) Suitable curing agents include amines, polyamines, polyamides, phenol and derivatives thereof, polysulfides, imidazoles, Lewis acids, acid anhydrides, or other nitrogen-containing compounds. Preferred curing agents include methyltetrahydrophthalic anhydride, polysebacic polyanhydride, polyazelaic polyanhydride, proprietary anhydride hardeners obtained from Anhydride and Chemicals Inc. of Newark, N.J., triethylenetetramine, hexanediamine, methanediamine, meta-phenylenediamine, 4,4'-methylenedianiline, diaminodiphenylsulfone, 1-methylimidazole, and benzyldimethyl amine. Curing accelerators, such as phenol or 2-ethyl-4-methylimidazole, may optionally be used, as is known in the art. When the epoxy end-capped oligomer of the present invention is cured, the oxirane ring opens up and reacts with the curing agent, as is known in the art and described by Lee and Neville in the book entitled "Handbook of Epoxy Resins," Chapter 5. Epoxy-Resin Curing Mechanisms, McGraw-Hill Book Company, New York, 1967, which is incorporated herein by reference. The cured product thus comprises these linkages formed when the oxirane ring reacts with the curing agent, which are referred to herein as "epoxy derived linkages". The polymer of the present invention has such epoxy derived linkages at regular intervals along the polymer chain.

As discussed with regard to the reaction of Equation (2), the ratio of the initiator to the diolefin determines the epoxy equivalent of this resin. Thus, in accordance with the present invention, the number of epoxy derived linkages and their position in the cured polymer chain can be predetermined. The polymer product can be provided as a ductile and easily processed resin. In addition, the polymerization of the epoxy end-capped oligomer in accordance with the present invention can be controlled by means of the epoxidizing agent and can provide reproducible results. By contrast, in some related known processes, free-radical polymerizaton occurs and cannot be controlled or accurately reproduced.

The polymers formed in accordance with the present invention exhibit high temperature stability, high elongation, low modulus, low glass transition temperatures, and low resin viscosity, as discussed in greater detail in Examples 3 and 4. These properties are critical for repairable adhesive, encapsulant, and coating materials that must perform in low temperature environments as well as withstand thermal cycling conditions. These properties also make the polymers of the present invention useful as adhesives and flexibilizers.

Examples of practice of the present invention are as follows.

EXAMPLE 1

This example illustrates the preparation of an epoxy end-capped oligomer in accordance with the present invention.

Dry cyclohexane in the amount of 400 ml was placed in a flame-dried three-neck, two liter flask. Then, there was added 300 ml of a 1.4M solution of sec butyllithium in cyclohexane (0.42 mol). The reaction flask was placed in a room temperature water bath, and 6.0 ml (0.042 mol) of dry triethylamine was injected into the flask with a syringe. At this time, 38.0 ml (33.3 g, 0.21 mol) of m-diisopropenyl benzene was added over a period of thirty minutes. The deep red reaction mixture was allowed to stir over a period of two hours. Then, 150ml (102.1g, 1.5 mol) of isoprene was added over a period of thirty minutes. The reaction mixture became warm and turned light red. It was then allowed to stir for one hour. The living oligomer was then added by a double needle technique to a stirred solution of 200 ml of epichlorohydrin (excess) in 200 ml solution of 200 ml hexane. A white precipitate of lithium chloride was formed; the solution was allowed to stir overnight.

The preferred method of workup of this mixture is filtration through a bed of Celite (diatomaceous earth) followed by evaporation of the excess solvent and epichlorohydrin at elevated temperature (maximum of 80° C.) and low pressure. Attempts to work up this mixture by conventional aqueous techniques created difficult-to-separate emulsions. The epoxy end-capped oligomer product was found to have Formula I, where

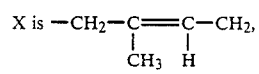

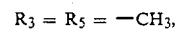

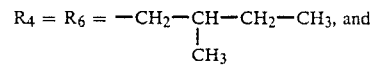

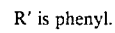

R' is phenyl.

The product was identified by infrared spectroscopy as follows:
IR (Neat): 3030 (m, sh), 3020 (m, sh), 2980 (s, brd), 1630 (w, sh), 590 (w, sh), 1430 (m, brd), 1360 (w, sh), 870 (w, brd).

EXAMPLE 2

This example illustrates the effect of varying the initiator/isoprene ratio in the process of Example 1.

The process described in Example 1 was followed to prepare 4 batches of epoxy end capped oligomer, each of which was subsequently cured as previously described herein. The epoxy equivalent (EEQ) of the resin so formed was measured by HBr titration in accordance with ASTM D1652 or by pyridium chloride pyridine titration as described by H. Donnenberg and W. R. Harp in *Anal. Chem.*, Vol. 28, 1956, page 86. As shown in Table I, the lower the ratio of initiator/isoprene, the lower the EEQ of the subsequently-formed cured resin.

TABLE I

| EFFECT OF VARIATION IN INITIATOR/ISOPRENE RATIO | | |
|---|---|---|
| Batch No. | Iniatiator/Isoprene | EEQ |
| 1 | 1/10 | 1200 |
| 2 | 1/7.9 | 560 |
| 3 | 1/5.8 | 420 |
| 4 | 1/7.9 | 540 |

EXAMPLE 3

This example illustrates the preparation of the cured epoxy polymer in accordance with the present invention and the characterization of the polymer.

The oligomers from batches 3 and 4 described in Example 2 were cured with various state-of-the-art epoxy hardeners, as shown in Table II. The resulting products were characterized by measuring glass transition temperature, coefficient of thermal expansion, and decomposition temperature, as shown in Table II. It was discovered that the selected anhydride hardeners gave cured materials with the desired low glass transition temperatures and high decomposition temperatures. The resins cured with the selected amine hardeners produced more rigidly cured materials.

Peel strength and lapshear strength specimens were prepared with the cured batch 3 oligomer. The cured material exhibited a very good peel strength (toughness) and an adequate lap shear strength. Tensile strength, tensile modulus, and elongation specimens were prepared with the batch 4 oligomer after curing. This material possesses a high elongation and low modulus. Its tensile strength is comparable to other low glass transition temperature plastics. These mechanical properties are summarized in Table III.

In a separate experiment, the above-noted oligomer was cured with hexanediamine and phenol. The resulting material gelled in about one hour at 71.1° C. (160° F.). The cured resin exhibited ductility comparable to the anhydride cured oligomers described above.

EXAMPLE 4

This example presents data comparing the properties of the resin of the present invention and a resin formed from a state-of-the-art epoxy material.

resin having an epoxy equivalent of 540. Scotchcast 280, obtained from 3M Company of St. Paul, Minn. was cured at 99° C. (210° F.) for two hours and postcured at 121° C. (250° F.) for two hours. The properties of these two materials were measured, and the comparative data is shown in Table IV.

As indicated by the data in Table IV, the resin of the present invention has a viscosity and pot life similar to those of the Scotchcast resin. However, the resin of the present invention has a desirably longer gel time, lower hardness, lower dielectric constant, and lower glass transition temperature than Scotchcast 280.

As can be seen from the data presented in the examples herein, the epoxy end-capped oligomers of the present invention provide cured resins or polymers with high temperature stability, high elongation, low modulus, low glass transition temperature, lower dielectric constant, and lower hardness, as well as longer gel time and low viscosity as compared to known materials. All these properties make the resins of the present inventions particularly well-suited for use as repairable encapsulants and tough adhesive and coating materials.

TABLE II

CHARACTERIZATION OF CURED RESINS

| Resin | Hardener | Tg's (°C.) TMA | Tg's (°C.) DSC | CTE (from TMA) ppm/°C. | CTE (from TMA) Range (°C.) | Td (from DSC) (°C.) |
|---|---|---|---|---|---|---|
| From Batch 3 Oligomer | PSPA + BDMA | 1 | −34, (3−7)* | 63 91 | −150 to −100 −100 to −50 | 283 |
| | PAPA + BDMA | −40, (0)* | −30, (0)* | 67 | −125 to −75 | 287 |
| | AC39 + BDMA | −30, 15 | −32, (0)* | 69 | −125 to −75 | 285 |
| | AC310 + BDMA | −5 to 20 | −2 | 101 | −75 to −25 | 300 |
| | MTHPA + 2,4-EMI | — | 40 | 111 | −50 to 0 | 270 |
| | MTHPA | −15 | −5 | 90−108 | −125 to −25 | 260 |
| | AC-39 | −17 | −23 | 61 | −100 to −50 | 300 |
| From Batch 4 Oligomer | TETA | — | −14 | — | — | 285 |
| | AC-39 | 5−9 | — | 91−108 | −125 to −25 | 335 |

| | |
|---|---|
| MTHPA | methyl tetrahydrophthalic anhydride |
| 2,4-EMI | 2-ethyl-4-methylimidazole |
| PSPA | polysebacic polyanhydride |
| PAPA | polyazelaic polyanhydride |
| AC-39 | proprietary anhydride hardener, Anhydrides & Chemicals |
| AC-310 | proprietary anhydride hardener, Anhydrides & Chemicals |
| TETA | triethylene tetramine |
| BDMA | benzyldimethylamine |
| Tg | glass transition temperature |
| CTE | coefficient of thermal expansion |
| Td | decomposition temperature |
| TMA | thermal mechanical analysis |
| DSC | differential scanning calorimetry |

*Unclear whether curve deflection signifies a true transition

TABLE III

MECHANICAL PROPERTIES OF CURED RESINS

| Batch No. | Curing Agent | Property | |
|---|---|---|---|
| 3 | Methyl Tetrahydrophthalic anhydride and 2-ethyl, 4-methyl imidazole | Peel strength Lapshear strength Tensile strength | 11.4 ± 3 lbs/in 649 ± 100 psi 147 ± 25 psi |
| 4 | AC-39 and Benzyl dimethyl amine | Elongation Modulus | 130 ± 8% 89 ± 22 psi (at 100% elongation) |

The epoxy end-capped oligomer of batch 4, described in Example 2, was cured with AC-39 (a proprietary anhydride hardener obtained from Anhydrides & Chemicals Co.) and benzyldimethylamine to form a

TABLE IV
COMPARATIVE DATA

| Property | Values Present Invention (Batch 4) | Scotchcast 280 |
|---|---|---|
| Viscosity, cps | 3,360 | 4,000 |
| Gel time at 120° C. min | 40 | 12–13 |
| Pot life at 25° C. hr | >19 | >19 |
| Hardness | 32–34 Shore A | 63–65 Shore D |
| Dielectric Constant, 1 KHz | 3.4 | 3.8–3.9 |
| Range - 1 KHz to 4 MHz | 3.4–2.8 | — |
| Dissipation Factor, 1 KHz | 0.041 | 0.022–0.030 |
| Range - 1 KHz to 4 MHz | 0.041–0.030 | — |
| Thermal Conductivity $\frac{\text{BTU-ft}}{\text{hr-ft}^2 \,°F.}$ | 0.13 | 0.26 |
| Tg, °C. (via thermomechanical analysis) | 5–9 | 26 |

Having thus described exemplary embodiments of the present invention, it should be noted by those skilled in the art that the disclosures within are exemplary only and that various other alternatives, adaptations and modifications may be made within the scope of the present invention. Accordingly, the present invention is not limited to the specific embodiments as illustrated herein, but is only limited by the following claims.

What is claimed is:

1. A method for forming a cured polymer having epoxy-derived linkages at regular intervals along the chain of said polymer, comprising the steps of:
   (a) reacting a 1,3-diolefin compound having 4 to 12 carbon atoms per molecule with a chosen difunctional initiator comprising anionic reactive sites, wherein the molar ratio of said initiator to said diolefin compound is within the range of about 1:4 to 1:15, to form an intermediate living oligomer comprising two anionic end groups;
   (b) reacting said intermediate living oligomer with a chosen halohydrin compound to epoxidize said two anionic end groups and form an epoxy end-capped oligomer having Formula I below:

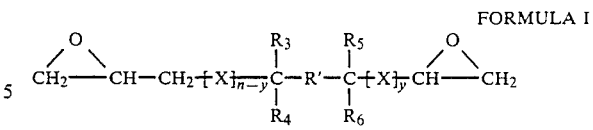

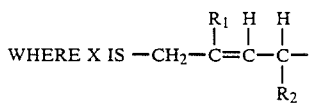

R' = ALIPHATIC, CYCLOALIPHATIC, OR AROMATIC GROUP HAVING 2 TO 20 C $R_1, R_2, R_3, R_4, R_5,$ OR $R_6$ IS H OR ALKYL n = 1 TO 10 y = 0 TO (n − 1)

(c) reacting said epoxy end-capped oligomer with an epoxy curing agent to polymerize said oligomer and form said polymer having an epoxy equivalent weight of about 400–1200.

2. The method of claim 1 wherein said conjugated 1,3-diolefin compound is selected from the group consisting of 1,3-butadiene; 2-methyl-1,3-butadiene; 1,3-pentadiene; 1,3-hexadiene; 1,3-heptadiene; 2,4-hexadiene; and 2,4-heptadiene.

3. The method of claim 1 wherein n is within the range of about 3 to 5.

4. The method of claim 1 wherein said chosen difunctional initiator is selected from the group consisting of an alkali metal alkyl compound and alkali metal aryl compound.

5. The method of claim 1 wherein said chosen difunctional initiator is formed by reacting secondary-butyllithium with meta-diisopropenyl benzene.

6. The method of claim 1 wherein said ratio equals one half the value of "n".

7. The method of claim 1 wherein said chosen halohydrin comprises epichlorohydrin.

8. The method of claim 1 wherein said epoxy curing agent comprises a compound selected from the group consisting of an anhydride, an amine, and a phenol.

* * * * *

UNITED STATES PATENT AND TRADEMARK OFFICE
CERTIFICATE OF CORRECTION

PATENT NO. : 4,977,220

DATED : December 11, 1990

INVENTOR(S) : Thomas K. Dougherty, Susan L. Oldham and William E. Elias

It is certified that error appears in the above-identified patent and that said Letters Patent is hereby corrected as shown below:

On the title page:

Abstract, lines 3-6;
Col. 2, lines 43-47;
Col. 3, lines 43-47;
Col. 6, lines 37-41; and
Col. 12, lines 2-6

} Delete formula and insert therefor the following:

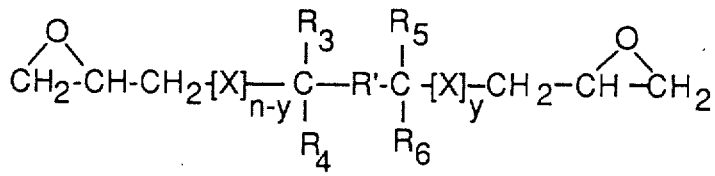

Col. 8, line 42, after "chloride", insert -- - (a hyphen) --.

Signed and Sealed this

Fourteenth Day of July, 1992

Attest:

DOUGLAS B. COMER

Attesting Officer

Acting Commissioner of Patents and Trademarks